United States Patent [19]

Boutni

[11] Patent Number: 4,707,511

[45] Date of Patent: Nov. 17, 1987

[54] THERMOPLASTICALLY MOLDABLE COMPOSITIONS

[75] Inventor: Omar M. Boutni, Mt. Vernon, Ind.

[73] Assignee: General Electric Company, Mt. Vernon, Ind.

[21] Appl. No.: 809,275

[22] Filed: Dec. 17, 1985

[51] Int. Cl.$^4$ .................... C08K 5/10; C08L 69/00; C08L 67/02

[52] U.S. Cl. ........................... 524/311; 524/537; 524/322

[58] Field of Search ............... 524/537, 308, 311; 525/439

[56] References Cited

U.S. PATENT DOCUMENTS

| | | | |
|---|---|---|---|
| 3,355,413 | 11/1967 | Kiefer | 524/605 |
| 3,516,957 | 6/1970 | Gray | 524/605 |
| 3,784,595 | 1/1974 | Schirmer | 524/318 |
| 4,125,572 | 11/1978 | Scott | 524/537 |
| 4,131,575 | 12/1978 | Adelmann | 524/311 |
| 4,373,067 | 2/1983 | Dieck | 524/313 |
| 4,408,000 | 10/1983 | Lee | 524/311 |
| 4,521,562 | 6/1985 | Rosenquist | 524/490 |
| 4,530,953 | 7/1985 | Yoshida | 524/311 |
| 4,532,290 | 7/1985 | Jaquiss | 524/605 |
| 4,536,538 | 8/1985 | Liu | 524/513 |
| 4,626,566 | 12/1986 | Miller | 524/537 |

FOREIGN PATENT DOCUMENTS 2754889 6/1978 Fed. Rep. of Germany ...... 524/537

Primary Examiner—C. Warren Ivy
Attorney, Agent, or Firm—Joseph T. Eisele; Martin B. Barancik

[57] ABSTRACT

Difficult to mold polyester resin containing compositions are made thermoplastically moldable by the addition of an aromatic polycarbonate and mold releasable by the addition of mold-release additives which are monomeric polyesters of a polyol and a fatty acid having from 14 to 36 carbon atoms, inclusive.

7 Claims, No Drawings

THERMOPLASTICALLY MOLDABLE COMPOSITIONS

BACKGROUND OF THE INVENTION

1. Field of the Invention

The invention relates to thermoplastically moldable polyester resin compositions.

2. Brief Description of the Prior Art

Polyester resins having properties useful for thermoplastic molding, such as injection molding, are well known. However, not all of the known polyester resins are useful for injection molding. Especially difficult to injection mold are those polyester resins which possess hot-melt adhesive properties. Other polyesters may not be classified as hot-melt adhesives, but when injection molded the heat-softened resin may adhere strongly to metal surfaces after cooling and re-solidifying. One class of such polyester resins are those obtained by the reaction of aromatic dicarboxylic acids with cyclo-aliphatic dialkanols. An example of such polyester resins is the one described in U.S. Pat. No. 2,901,466.

It will be appreciated by those skilled in the art of injection molding that these polyesters are generally unsuited for molding in conventional injection molding apparatus. The polyester wraps itself around the screw and adheres to the metallic surfaces of the injection molding machine.

However, these polyesters have other physical properties which may be desirable in molded articles and in articles molded from blends of adhesive resins with compatible synthetic polymeric resins which are not themselves difficult to mold by thermoplastic molding techniques. We have found that a particular class of mold release agents, added to these polyesters blended with polycarbonates provide thermoplastically moldable compositions which are useful to injection mold a wide variety of articles. The agents do not significantly degrade the molded resin articles, in the proportions employed.

SUMMARY OF THE INVENTION

The invention comprises a thermoplastically moldable, synthetic resin composition, which comprises;

a polyester resin prepared by condensing the cis- or trans- isomer of 1,4-cyclohexanedimethanol with a hexacarbocyclic dicarboxylic acid; an amount of aromatic polycarbaonate which allows the polyester resin to be injection moldable; and an effective amount for mold release of a mold release additive selected from compounds which are monomeric polyesters of a polyol and a fatty acid having from 14 to 36 carbon atoms, inclusive.

Preferred monomeric polyesters are those of the formula:

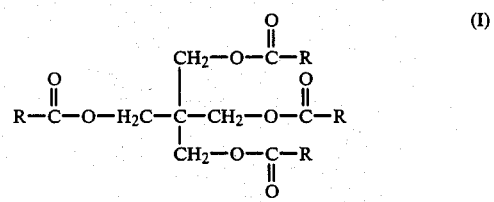

wherein R represents aliphatic hydrocarbyl of 13 to 35 carbon atoms, inclusive.

The term "hydrocarbyl" as used herein means the monovalent moiety obtained upon removal of a hydrogen atom from a parent aliphatic hydrocarbon. Representative of aliphatic hydrocarbyl are alkyl of 13 to 35 carbon atoms, inclusive, such as tridecyl, tetradecyl, pentadecyl, hexadecyl, heptadecyl, octadecyl, nonodecyl, eicosyl, heneicosyl, docosyl, tricosyl, tetracosyl, pentacosyl, hexacosyl, heptacosyl, octacosyl, nonoacosyl, triacontyl, hentriacontyl, dotriacontyl, tritriacontyl, pentatriacontyl and the isomeric forms thereof; alkenyl of 13 to 35 carbon atoms, inclusive, such as tridecenyl, pentadecenyl, octadecenyl, pentacosynyl, triacontenyl, tetracontenyl and isomeric forms thereof.

The compositions of the invention are useful for injection molding of complex parts such as valves and the like. The preferred molded articles may be sterilized by radiation and are stable in clarity and at elevated temperatures.

DETAILED DESCRIPTION OF THE PREFERRED EMBODIMENTS OF THE INVENTION

Synthetic polyester resins used in the present invention are a well known class of polyester resin. Representative of such polyester resins are those prepared by condensing either the cis- or trans- isomer (or a mixture thereof) of 1,4-cyclohexanedimethanol with a hexacarbocyclic dicarboxylic acid to produce a polyester having recurring units of the formula:

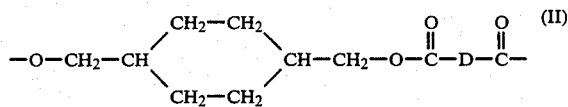

wherein the substituted cyclohexane ring is selected from the group consisting of the cis- and trans- isomers thereof and D represents an organic radical containing from 6 to 20 carbon atoms, which is the decarboxylated residue derived from a hexacarbocyclic dicarboxylic acid.

Preferred polyester resins of the formula (II) given above may be derived from the reaction of either the cis- or trans- isomer (or a mixture thereof) of 1,4-cyclohexanedimethanol with a mixture of iso- and terephthalic acids. These polyesters have recurring units of the formula:

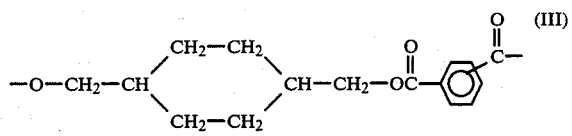

and these polyesters may be produced by well known methods in the art such as those set forth in U.S. Pat. No. 2,901,466 which is incorporated herein by reference.

Of course, it is understood that the polyester resins may also be prepared by condensing 1,4-cyclohexanedimethanol and minor amounts of other bifunctional glycols containing from 2 to 10 or more carbon atoms such as ethylene glycol, butylene glycol, and the like.

Examples of hexacarbocyclic dicarboxylic acids wherein the carboxy radicals are attached in para relationship to a hexacarbocyclic residue indicated by D in formula (II) include terephthalic acid, trans-hexhydroterephthalic acid, p,p'sulfonyldibenzoic acid, 4,4'-diphenic acid, 4,4'-benzophenonedicarboxylic acid, 1,2-di(p-carboxyphenyl) ethane, 1,2-di(p-carboxyphenoxy) ethane, 4,4'-dicarboxydiphenyl ether, etc. and mixtures of these. All of these acids contain at least one hexacarbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings. Of course, either fused or attached rings can be present. All of the compounds named in this paragraph come within the scope of this preferred group. The preferred dicarboxylic acid is terephthalic acid, or mixtures of terephthalic and isophthalic acids.

The above-described polyesters generally have an intrinsic viscosity between 0.40 and 2.0 dl/g measured in a mixture of 40% tetrachloroethane/60% phenol solution or a similar solvent at 25° C.–30° C. Especially preferred polyesters will have an intrinsic viscosity in the range of 0.6 to 1.2 dl/g.

A wide variety of compatible (for blending) aromatic polycarbonate resins are well known and are characterized in part by having recurring polymer units of the formula:

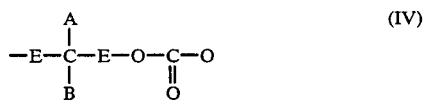

(IV)

wherein each —E— is selected from the group consisting of phenylene, halo-substituted phenylene and alkyl substituted phenylene and A and B are each selected from the group consisting of hydrogen, hydrocarbyl radicals free from aliphatic unsaturation and radicals which together with the adjoining

atom form a cycloalkane radical, the total number of carbon atoms in A and B being up to 12.

The above-described aromatic polycarbonate resins may be prepared by methods well known in the art; see for example the method described in U.S. Pat. No. 3,989,672. Thus, they may be prepared in the conventional manner by reacting a dihydric phenol with a carbonate precursor in an interfacial polymerization process. Typical of some of the dihydric phenols that may be employed are bisphenol-A, (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)-propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in this invention. Also employed in the practice of this invention may be blends of any of the above materials to provide the aromatic carbonate polymer component.

The carbonate precursor may be either a carbonyl halide, a carbonate ester or a haloformate. The carbonyl halides which can be employed are carbonyl bromide, carbonyl chloride and mixtures thereof. Carbonyl chloride, also known as phosgene, is preferred.

Within the definition of polycarbonate also are copolyester-carbonates, that is the polymer made from a dihydric phenol, a dibasic acid and a phosgene precursor. The U.S. Pat. No. 3,169,121 discloses such copolyester-carbonates and methods of preparing them.

Also included herein are branched polymers wherein a polyfunctional aromatic compound is reacted with the dihydric phenol and carbonate precursor to provide a thermoplastic randomly branched polycarbonate polymer, wherein the recurring units of formulae (III) and (IV) above contain branching groups. The method of their preparation is described in the U.S. Pat. No. 4,001,184, incorporated herein by reference.

Also included herein are blends of a linear polymer and a branched polymer.

Preferred polycarbonate resins employed in blends with the polyester resins previously described have an intrinsic viscosity between 0.3 and 1.0 deciliters/gram (dl/g), most preferably from 0.40 to 0.65 dl/g as measured at a temperature of 25° C. in methylene chloride or a like solvent.

The blends of polyester and polycarbonate resins are well known as are methods of their preparation; see for example the description given in U.S. Pat. No. 4,188,314. In general, the blends may be prepared under extrusion conditions (melt blending). The blends may comprise from about 10 to 95 parts by weight of the polyester resin and from 5 to 90 parts by weight of the polycarbonate resin, preferably a maximum amount of polyester of 50 weight percent of the blend of polyester and polycarbonate.

The thermoplastically moldable compositions of the invention are prepared by the method of the invention, which comprises blending into the polyester resins or blends thereof with a polycarbonate resin, an effective amount for mold release of a compound of the formula (I) given above. An effective amount is generally within the range of from about 0.001 to about 0.45 weight percent of resin preferably 0.1 to 0.3 weight percent. Greater amounts may be used, but generally are unnecessary or undesirable. Higher amounts may result in resin degradation, particularly at elevated temperatures. The mold release additives may be added to the polyester resin or blend thereof in the same manner as any conventional additive, for example, in the dry state and coextruded or in a solvent and melt extruded with the resin.

Other additives in common use in thermoplastic resins may also be added. For example with respect to blends with an aromatic polycarbonate, additives which are commonly known to stabilize the resin thermally such as phosphite can be employed. Hydrolytic stabilizers such as a epoxides may also be employed as well as agents which are flame retardants, drip inhibitors, ductility enhancers, anti-oxidants, solvent resistance enhancers, ultraviolet light stabilizers and various inert fillers.

Mold-release additive compounds employed in the method of the invention such as those of the formula (I) given above are well known as are methods of their preparation. The mold release additives employed in the compositions of the invention are monomeric polyesters prepared by the reaction of a polyol and a fatty acid, for example a fatty acid having from 14 to 36 carbon atoms, inclusive. Representative of such fatty acids are tetradecanoic, pentadecanoic, hexadecanoic, heptadecanoic, octadecanoic, nonadecanoic, eicosanoic, henecosanoic, decosanoic, tricosanoic, tetracosanoic, pentacosanoic, hexacosanoic, triacontanoic, hentriacontanoic, dotriacontanoic, tetratriacontanoic, pentatriacontanoic, hexatriacontanoic acids; and the like.

The polyols which may be employed to prepare the polyester mold release additives employed in the invention are all well known as is the method of their preparation. Representative of such polyols are polyhydric alcohols having from 2 to 9 hydroxyl groups. Representative polyhydric alcohols are ethylene glycol, 1,3-propanediol, 1,4-butanediol, 1,5-pentanediol 1,6-hexanediol, a polyglycol such as diethylene glycol, triethylene glycol, dipropylene glycol, dibutylene glycol, trimethylene glycol, isobutylene-ethylene glycol, trimethylene glycol; the monoethyl, monopropyl or monobutyl ethers of glycerol, dicyclopentadienyl dimethanol, pentaerythritol, dipentaerythritol, tripentaerythritol, trimethylolpropane, trimethylolethane, etc., glycerol, glycerol mono-acetate, mannitol, sorbitol, xylose, and the like, or mixtures thereof. Preferably, the polyols employed to prepare the polyesters are aliphatic polyols.

The monomeric polyesters employed in the method of the invention, including the preferred polyesters of formula (I) given above may be prepared by known esterification technique. In general, they may be prepared by reacting an equivalent excess of the fatty acid with the polyol. The term "equivalent excess" is used here to mean that the proportion of fatty acid employed is such that substantially all of the hydroxyl groups on the polyol are theoretically reacted. The proportion will depend upon the functionality of the polyol.

The condensation of aliphatic fatty acid with polyol is effected by admixing the two reactants and heating the admixture. Heating may be carried out in the presence of a catalytic proportion of a condensation catalyst, however lighter colored products may be obtained if the condensation is carried out without the assistance of a catalyst. Representative of condensation catalysts which may be used are zinc acetate and preferably p-toluenesulfonic acid. The catalyst is employed in a catalytic proportion, which is generally within the range of from about 0.0001 to about 1.0 percent by weight of the starting reactants. The heating step may be carried out over a wide range of temperatures, i.e., from about 150° C. to about 300° C. Preferably the heating step is carried out under an inert gaseous atmosphere such as a nitrogen gas atmosphere. During the reaction it is advantageous to remove the water of condensation as it forms. Thus, removal of water may be carried out by conventional techniques well known to those skilled in the art, for example by azeotropic distillation.

The time required to complete the condensation of acid and polyol varies depending on the nature of the reactants, catalyst and reaction temperature used. Progress of the reaction is observable by periodic analysis to determine the acid number of the reaction mixture.

Upon completion of the reaction, the desired polyester may be separated from the reaction mixture by conventional techniques such as, for example, by extraction in solvent, washing and stripping of solvent. Generally the crude reaction mixture contains substantial proportions of excess fatty acid reactant. According to a preferred embodiment of the invention, the excess fatty acid may be allowed to remain in admixture with the polyester and used as a mold release additive in the method of the invention.

Particularly advantageous compositions of the invention are ones which include a mixture of the monomeric polyester mold release additive and a fatty acid of 14 to 36 carbon atoms, inclusive, as described above. The mixtures may comprise mixtures in a ratio of from 2:1 to 4:1 (polyester to fatty acid); preferably 3:1.

The following examples describe the manner and process of making and using the invention and set forth the best mode contemplated by the inventor of carrying out the invention but are not to be construed as limiting the invention. All proportions of the mold releasing additives are in weight percent (parts by weight) of the base thermoplastic resin.

The mold-release pressures obtained with the various mold-release additives were obtained on an injection molding machine with a 118 cc shot capacity. The mold is a 7.62 cm × 7.62 cm box with a 3.8 cm wall height. It has ejector pins at four corners with two of the pins being attached to strain gauge transducers for measuring the part ejection pressure. The mold is designed with very little draft so that the part would tend to stick to the core unless mold-release is used. The pressures reported are an average of a number of mold ejections. The number of ejections averaged is also reported.

The yellowing Index (YI), where reported, was determined by the method of ASTM-D-1925-70.

EXAMPLES 1-6

A resin blend of 50 parts of poly(1,4-cyclohexane-dimethanol-terephthalate-co-isophthalate) [Kodar ® A-150, Eastman Kodak Co. made from the reaction of terephthalic acid and isophthalic acid with the glycol 1,4-cyclohexanedimethanol] and 50 parts of a polycarbonate resin (LEXAN ® 105, General Electric Co.) stabilized with 0.1 parts of an aqueous solution of phosphorous acid (70%) is provided. The polycarbonate resin is the product of reaction of bisphenol-A and phosgene and has an inherent viscosity of from 0.40 to 0.65 dl/g measured at 25° C. in methylene chloride.

The resin mixture (100 parts) is separately dry formulated with a variety of mold-release agents, blended and melt extruded from a conventional extruder into the box mold described above. After cooling to a demolding temperature, the molding is ejected. The agent and the proportion added (PBW) together with the averaged observed ejector pin pressures are set forth in the following Table, with the number of readings of pin pressure averaged, the yellowing index (YI) observed, the light transmittance of the molded product and the percent of haze observed for the molded product.

EXAMPLE 7

The procedure of Examples 1-6, supra., is repeated except that no additive is added to the resin blend. The molding results are set forth in the Table, below is a control.

EXAMPLE 8

The procedure of Examples 1-6, supra., is repeated except that in place of the resin blend as used therein, 100 parts of the Kodar A-150 polyester alone are used. The resin could not be injection molded.

TABLE

| EXAMPLE | ADDITIVE | PBW | EJECTOR PIN PRESSURE (Kg/cm$^2$) | NO. READINGS | YI | TRANSMITTANCE (%) | HAZE (%) |
|---|---|---|---|---|---|---|---|
| 1 | PETS* | 0.3 | 337.8 | (11) | 2.65 | 89.5 | 1.0 |
| 2 | PETS | 0.45 | 242.1 | (9) | −0.3 | 82.7 | 0.9 |
| 3 | PETS | 0.45 | 232.0 | (16) | 2.5 | 89.9 | 0.8 |
| 4 | PETS PLUS STEARIC ACID | 0.3 0.05 | 230.9 | (10) | 2.1 | 89.3 | 0.5 |
| 5 | PETS PLUS STEARIC ACID | 0.3 0.1 | 213.2 | (13) | | | |
| 6 | PETS PLUS DOCOSANOIC ACID | 0.3 0.1 | 197.2 | (9) | 2.1 | 89.5 | 0.5 |
| 7 (Control) | None | 0 | Parts broke, could not be ejected. | | | | |

*PETS = PENTAERYTHRITOLTETRASTEARATE

What is claimed:

1. A thermoplastically injection moldable, synthetic resin composition, which comprises;
    a polyester resin prepared by condensation of a diol selected from the group consisting of the cis- and the trans-isomer of 1,4-cyclohexanedimethanol with a hexacarbocyclic dicarboxylic acid selected from the group consisting of isophthalic acid, terephthalic acid and mixtures thereof;
    a quantity of aromatic polycarbonate resin sufficient to render the polyester injection-moldable; and
    an effective amount for mold-release of a mold-release additive selected from compounds which are of formula:

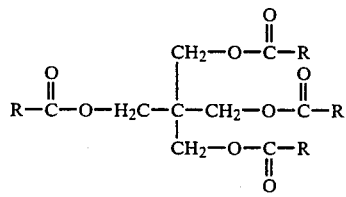

wherein R represents aliphatic hydrocarbyl of 13 to 35 carbon atoms, inclusive.

2. The composition of claim 1 wherein the effective amount is within the range of from about 0.001 to 0.45 weight percent of the resin.

3. The composition of claim 2 wherein the polycarbonate resin from 5 to 85 weight percent of the composition.

4. The composition of claim 1 wherein the additive is pentaerythritoltetrastearate.

5. The composition of claim 1 wherein the additive also comprises a fatty acid of 13 to 35 carbon atoms, inclusive.

6. The composition of claim 5 wherein the fatty acid is stearic acid.

7. The composition of claim 5 wherein the fatty acid is docosanoic acid.

* * * * *